C. F. M. VAN BERKEL.
GRIP FOR SLICING MACHINES.
APPLICATION FILED JUNE 29, 1917.
1,276,135.
Patented Aug. 20, 1918.
2 SHEETS—SHEET 1.
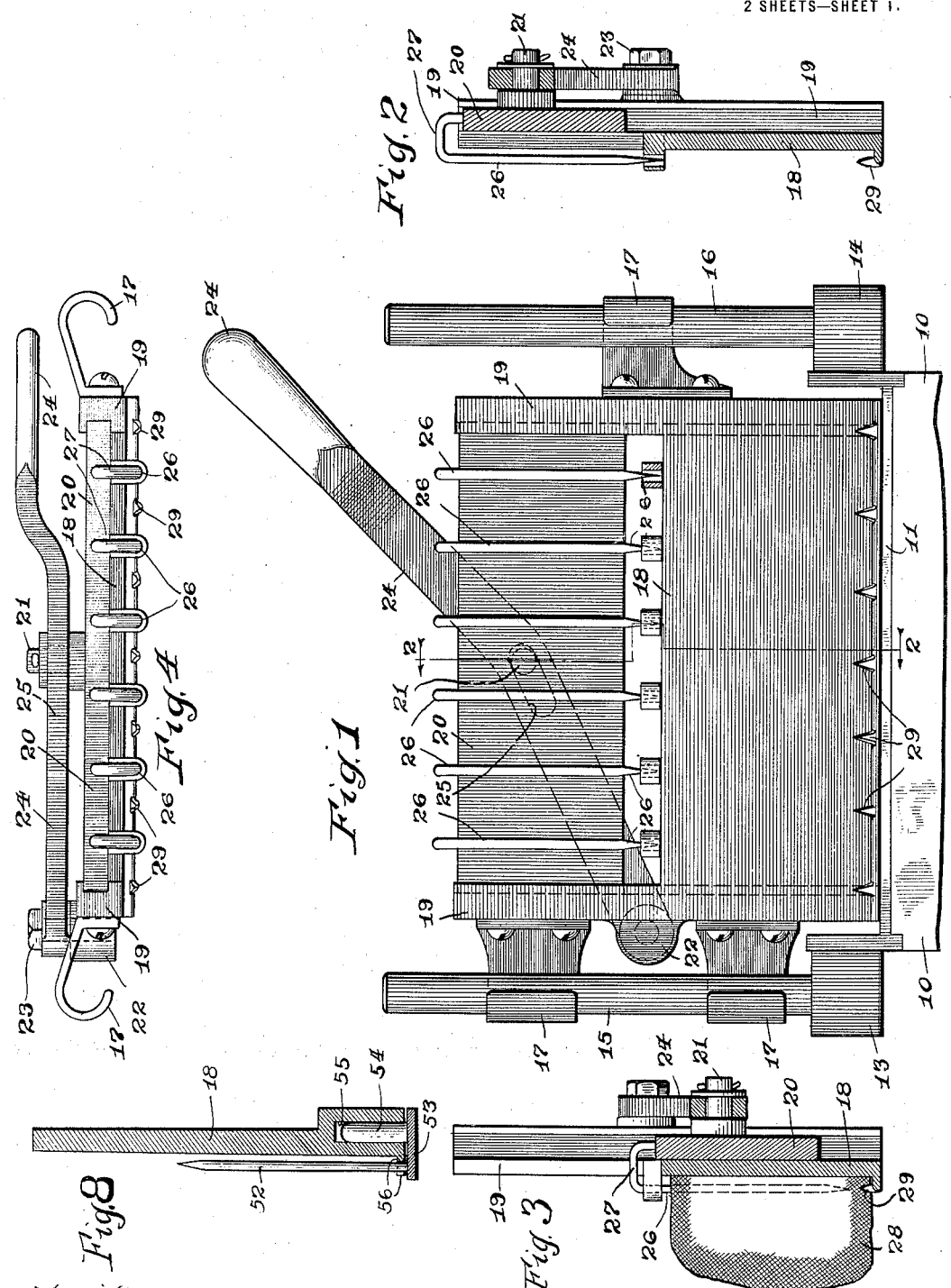
Witness:
S. B. Graham
Inventor:
Cornelis F. M. van Berkel
By Browne Nissen Sprinkle
Att'ys C. F. M. VAN BERKEL.
GRIP FOR SLICING MACHINES.
APPLICATION FILED JUNE 29, 1917.
1,276,135.
Patented Aug. 20, 1918.
2 SHEETS—SHEET 2.
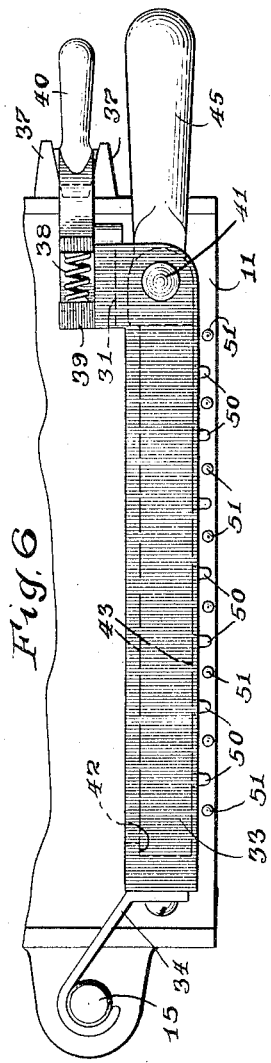
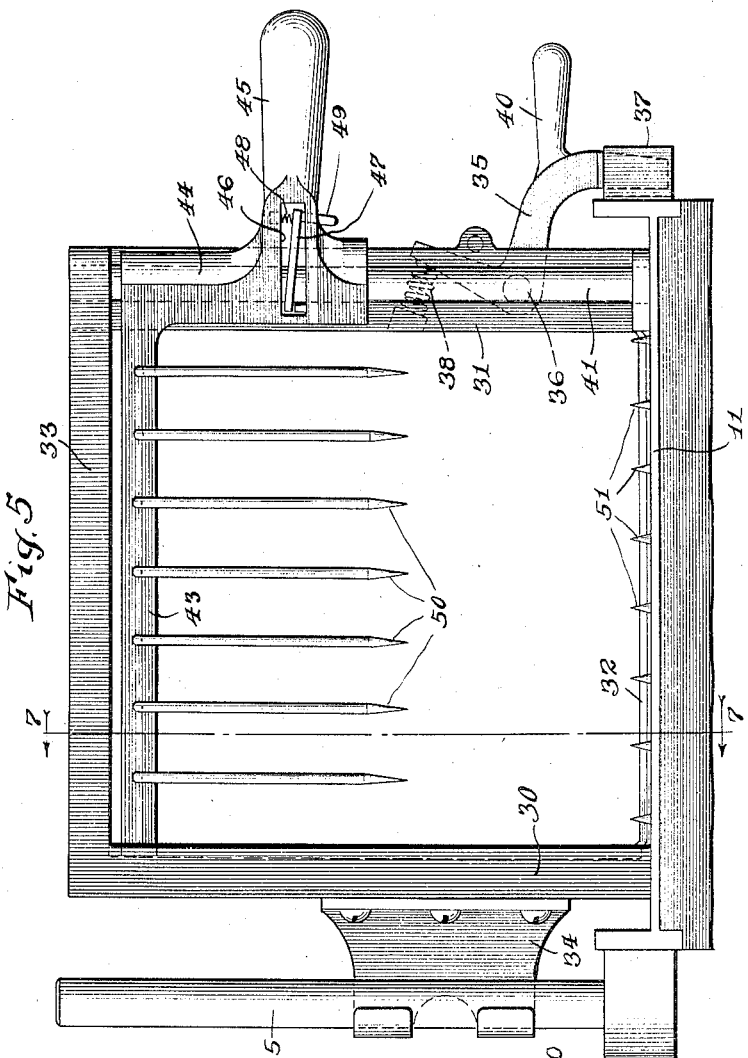
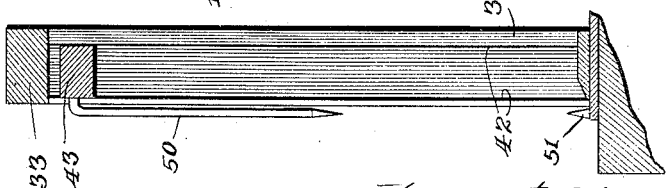
Inventor:
Cornelis F. M. van Berkel

UNITED STATES PATENT OFFICE.

CORNELIS F. M. VAN BERKEL, OF LAPORTE, INDIANA, ASSIGNOR TO U. S. SLICING MACHINE COMPANY, OF LAPORTE, INDIANA, A CORPORATION OF INDIANA.

GRIP FOR SLICING-MACHINES.

1,276,135.  Specification of Letters Patent.  Patented Aug. 20, 1918.

Application filed June 29, 1917. Serial No. 177,620.

*To all whom it may concern:*

Be it known that I, CORNELIS F. M. VAN BERKEL, a subject of the Queen of the Netherlands, and a resident of Laporte, in the county of Laporte and State of Indiana, have invented certain new and useful Improvements in Grips for Slicing-Machines, of which the following is a specification.

This invention relates to devices for holding the material while it is being operated upon by slicing machines of well-known construction, and has for its object the provision of a device of the kind mentioned which shall be of improved construction and more efficient and convenient in operation than similar devices previously known.

The invention is exemplified in the combination and arrangement of parts shown in the accompanying drawings and described in the following specification, and it is more particularly pointed out in the appended claims.

In the drawings—

Figure 1 is a front elevation of one embodiment of the present invention;

Fig. 2 is a vertical sectional view on line 2—2 of Fig. 1;

Fig. 3 is a view similar to Fig. 2 but showing the gripping plate in a different position;

Fig. 4 is a top plan view of the device shown in Fig. 1;

Fig. 5 is a front elevation of a modified form of the invention;

Fig. 6 is a top plan view of Fig. 5; and

Fig. 7 is a section on line 7—7 of Fig. 5.

Fig. 8 is a detail sectional view of a slightly modified construction.

Referring first to Figs. 1 to 4 inclusive, the numeral 10 designates the reciprocating carriage or table of a slicing machine of the kind now in general commercial use. A meat plate 11 is mounted to slide on the carriage 10 and is provided with the ordinary mechanism, not shown, for feeding the plate toward the slicing knife after each slicing operation. The plate 11 is provided at the opposite sides of its front edge, with projections 13 and 14 which carry uprights 15 and 16 respectively. The meat clamping device is mounted upon the plate 11 and is secured to the uprights 15 and 16 by means of hooked plates 17, which may be slid downwardly into place over the uprights. The hooks 17 are secured to an upright plate 18, which forms the principal part of the framework of the clamping apparatus, and carries at each end on the rear side thereof, a channel member 19, which extends upwardly above the upper edge of the plate itself. The channel members 19 form guides for a vertically sliding plate 20 which has its opposite ends fitted to the channels of the members 19 and which carries a rearwardly extending pivot pin 21 rigidly secured to the plate at the central portion thereof. A bearing lug 22 is carried by the frame plate 18 at one side of the clamp and carries a pivot 23 on which an operating lever 24 is mounted. The lever 24 is provided with a slot 25 which receives the pivot pin 21 carried by the sliding plate 20.

The sliding plate 20 has a series of prongs or tines 26 positioned in front of the plate 18 a sufficient distance to permit the tines to enter a piece of material shown at 28 in Fig. 3 of the drawing, and hold the material firmly against the front surface of this plate. Guides 26' are supported on the plate 18 and brace the tines 26 at points adjacent the position where they enter the meat. These brace the tines at the time the greatest force is exerted on them at points farthest removed from their base and so most effectively counteract any tendency to bend them out of true. The guides 26' also act as strippers to hold the material from movement during withdrawal of the tines. The tines 26 coöperate with upwardly projecting teeth 29 connected with the lower portion of the plate 18 and spaced forwardly from the front edge of this plate into alinement with the tines 26. The teeth 29 are, however, preferably staggered relative to the tines 26 so that the teeth and tines, although lying in the same plane parallel with the plates 18 and 20, do not have their points directly opposed to one another, but alternate with one another in the direction of the plane. In the drawing, I have shown the teeth 29 formed integrally with the plate 18, but it is apparent that such teeth might be secured to the meat plate 11 in the manner commonly employed in such devices, since the plate 11 and the gripping mechanism are held in fixed relation to one another when in use.

In operation, the material 28 to be sliced, is placed against the front surface of the plate 18 and in contact with the points of the teeth 29. The lever 24 is then pressed downwardly, which forces the tines 26 through the material and firmly holds it in position against the plate 18, which thus forms a support or back plate for the material during the slicing operation. It should be noted that although the lever 24 affords a considerable mechanical advantage for exerting downward pressure upon the plate 20, this result is accomplished without disturbing the horizontal arrangement of the plate 20, and the parallelism of the tines 26 in their various positions while entering the material to be gripped. These are important features in the operation of devices of this particular character, since it would disturb the proper operation of the tines 26 if the bar 20 were swung about a pivotal center in a manner commonly employed in clamps for slicing machines. Where the tines are of sufficient length to penetrate substantially through the material to be held, a leverage device affording a mechanical advantage for forcing the tines through the material is important, and the arrangement shown and described combines such a leverage mechanism with a guide for causing the tines to move always in parallelism.

In the modified form shown in Figs. 5, 6 and 7, the plate 11 is provided with but a single upright 15, the opposite side of the plate being left unobstructed. In this form, the back plate is omitted and an open rectangular frame is provided having upright side pieces 30 and 31 which are connected at their bottom by the bar 32 and at their top by the corresponding bar 33. The side piece 30 carries a strap hook 34 which engages the upright 15, and the bar 31 has a detent 35 pivotally mounted at 36 and arranged to engage projections 37 extending from the side of the plate 11 in a manner to hold the side piece 31 from lateral movement. The detent 31 is resiliently forced into position between the projections 37 by a spiral spring 38, one end of which bears against the upper end of the detent and the other end against a shoulder 39 carried by the side piece 31. A handle 40 is provided for raising the detent 35 out of engagement with the lugs 37. It will be seen that the spring 38 continually tends to draw the detent 35 into engagement with the plate 11 and thus hold the strap hook 34 in firm contact with the upright 15.

The upright 31 is slightly offset rearwardly from the horizontal bars 32 and 33, and a standard 41 extends between the horizontal bars in front of the upright 31 and spaced slightly therefrom. The upright 30 is provided on its inner side with a channel guideway 42 which receives the end of a clamping bar 43 and guides the bar in vertical movement toward and away from the meat plate 11. The opposite end of the bar 43 is provided with an elongated sleeve 44 which surrounds the standard 41 and is of sufficient length to avoid binding of the sleeve on the bar when it is slid longitudinally thereon. The handle 45 projects laterally from the sleeve 44 and is provided with an opening 46 in which is positioned a gripping plate 47 surrounding the standard 41 and arranged to grip the standard to hold the sleeve 44 against upward movement in a well-known manner. A spring 48 normally holds the plate 47 in position to resist upward movement of the sleeve, but the gripping action of the plate may be released by upward pressure upon a finger piece 49, as will be readily understood.

Since an open frame is provided in this form of the invention, it is not necessary to grasp the material adjacent a flat surface formed by a slicing cut, as is usually done in the form previously described, but the material may extend through the opening in the frame to any desired extent on either side of the clamp. Tines 50, similar to those shown at 26, in the form previously described, are carried by the clamping bar 43 and project downwardly from the front edge of the bar. The plane of the tines 50 coincides with the plane of the teeth 51 on the meat support, the teeth 51 in this instance being shown carried by the plate 11, although, as previously stated, they may be formed upon the meat grip itself, if it is so desired. It is also apparent that a lever similar to that shown in the form previously described can be used, as well, in connection with this form.

In the form shown in Fig. 8, elongated tines 52 extend upwardly from points adjacent the base of the back plate 18 and are spaced in front of the plate to receive the material to be sliced. The tines 52 may be rigid with the back plate but I prefer to have them carried by a movable plate or bar 53 which is positioned beneath the lower edge of the plate 18. Pins 54 extend into openings 55 in the lower edge of the back plate and hold the bar 53 in place. After a slicing operation is completed the tines 52 may be withdrawn to release the last slice. The last slice is held during the withdrawal of the tines by a ledge 56 provided with notches 57 to accommodate the tines. Where this arrangement of tines is employed the back plate is allowed to extend above the points of the tines a sufficient amount to guide the material as it is moved into place. The lower elongated tines may be used alone or in conjunction with the downwardly moving tines shown in the other figures.

I claim:

1. A device for holding material to be sliced, comprising a support, elongated tines for entering the material and of a length to pass substantially therethrough in the direction of the plane of the slices, and means for moving the tines toward the support to cause them to penetrate the material to be sliced.

2. A device for holding material to be sliced, comprising a support, upwardly projecting teeth carried by said support, elongated tines arranged in the same vertical plane with said teeth, and means for moving said tines toward said support to cause them to penetrate the material to be sliced to a position adjacent said teeth.

3. A device for holding material to be sliced, comprising a support for said material elongated tines arranged to penetrate said material and of a length to pass substantially therethrough in the direction of the plane of the slices, means for moving said tines toward said support to cause them to penetrate said material, and arranged to afford a mechanical advantage for increasing the force exerted upon said tines, and means for guiding said tines during said movement in straight lines through said material.

4. A device for holding material to be sliced, comprising elongated tines arranged to penetrate substantially through the material to be held, and a power multiplying device for forcing said tines into said material.

5. A device for holding material to be sliced, comprising elongated tines arranged to penetrate the material to be sliced, a power multiplying device for forcing said tines into said material, and means for slidably engaging said tines to guide them in the direction of the plane of the slices during their movement into said material.

6. In a device for holding material to be sliced, a back plate, a plurality of elongated tines, and means for moving said tines into a position adjacent the surface of said back plate, and spaced slightly therefrom, to cause said tines to penetrate material held against the surface of said back plate.

7. A device for holding material to be sliced, comprising a back plate, teeth positioned adjacent the lower edge of said back plate and spaced slightly therefrom, elongated tines positioned in the plane of said teeth, and a power multiplying device for moving said tines toward said teeth and into a position adjacent the surface of said back plate and spaced slightly therefrom, to cause said tines to penetrate material held against the surface of said plate and to coöperate with said plate and teeth to hold said material during a slicing operation.

8. A device for holding material to be sliced, comprising a support for the material having teeth thereon, a vertical back plate positioned adjacent said teeth, elongated tines, a power multiplying device for moving said tines toward said teeth and said support into a position adjacent the vertical surface of said plate and spaced slightly therefrom, and means for guiding said tines to cause said tines to move in straight lines into said position through material held against said plate and in contact with said teeth, and to coöperate with said power multiplying device to bring said tines into coöperative relation with said teeth and back plate for holding said material during a slicing operation.

9. In combination, a plate for supporting material to be sliced, and a device for gripping said material and holding it upon said plate, said gripping device comprising an upright frame provided with vertical guides, a gripping bar mounted to slide in said guides, elongated tines carried by said bar and projecting downwardly therefrom, a lever pivoted to said frame and arranged to engage said bar to force said bar toward said plate and to cause said tines to penetrate the material to be sliced, and a back plate carried by said frame for holding the material in position to receive said tines during their downward movement.

10. A device for holding material to be sliced, comprising a supporting plate, an upright open frame, a clamping bar guided by said frame for vertical movement across the opening therein, and elongated tines carried by said bar and movable therewith across the opening in said frame, and arranged to move in straight lines substantially entirely through the material in unison with the movement of said clamping bar.

11. A device for holding material to be sliced comprising elongated tines for entering the material, means for moving the tines, and means for bracing the tines adjacent the point where they enter the material.

12. A device for holding material to be sliced comprising a support, elongated tines for entering the material, means for moving the tines toward the support to cause them to penetrate the material to be sliced, and guides for bracing said tines adjacent the point where said tines enter said material.

13. A device for holding material to be sliced comprising a supporting surface, elongated tines spaced slightly from said surface and parallel therewith, and means for moving said tines from their position adjacent said surface to permit the removal of a slice of material held by said tines and surface.

14. A holder for material to be sliced comprising a device having a surface arranged to engage said material, and elongated tines arranged adjacent said surface and parallel therewith and spaced slightly therefrom.

15. A holder for material to be sliced comprising a plate having a surface for engaging said material, and elongated tines arranged alongside and parallel with said surface and spaced slightly therefrom, said surface extending beyond the points of said tines for guiding material as it is moved onto said tines.

16. A holder for material to be sliced comprising a plate having a surface for engaging said material, elongated tines for penetrating said material, and means for removably holding said tines in a position parallel with the surface of said plate and spaced slightly therefrom, said surface extending beyond the points of said tines a sufficient distance for guiding material onto said tines.

17. A holder for material to be sliced comprising tines of a length to extend substantially through a piece of said material in a direction parallel with the plane of the slices and movable into and out of engagement with said material, and means for engaging the surface of said material which extends at an angle to the plane of the slices for stripping the material from said tines.

18. A holder for material to be sliced comprising elongated tines in the direction of the plane of the slices, means for moving said tines into and out of penetrating engagement with said material, and means for guiding said tines adjacent the point where they enter said material, said guiding means being arranged to engage said material to strip it from said tines during the withdrawal of said tines from said material.

19. A holder for material to be sliced comprising elongated tines arranged to penetrate said material, and stops arranged to overlie said material and to hold said material against movement during the withdrawal of the tines from engagement therewith.

In testimony whereof I have signed my name to this specification, on this 26th day of June, A. D. 1917.

CORNELIS F. M. van BERKEL.